(12) United States Patent
Fukeda et al.

(10) Patent No.: US 8,245,485 B2
(45) Date of Patent: Aug. 21, 2012

(54) VERTICAL-TYPE BAG PACKAGING METHOD AND APPARATUS

(75) Inventors: Shinichi Fukeda, Iwakuni (JP); Kazunori Yamamoto, Iwakuni (JP)

(73) Assignee: Toyo Jidoki Co., Ltd., Tokyo (JP)

( * ) Notice: Subject to any disclaimer, the term of this patent is extended or adjusted under 35 U.S.C. 154(b) by 574 days.

(21) Appl. No.: 12/380,147

(22) Filed: Feb. 24, 2009

(65) Prior Publication Data

US 2010/0018160 A1    Jan. 28, 2010

(30) Foreign Application Priority Data

Jul. 22, 2008  (JP) ................................ 2008-188234

(51) Int. Cl.
*B65B 31/00* (2006.01)
(52) U.S. Cl. ............ 53/95; 53/284.7; 53/374.8; 53/570; 53/DIG. 2
(58) Field of Classification Search ............. 53/95, 212, 53/284.7, 373.7, 373.9, 374.8, 570, 512, 53/DIG. 2
See application file for complete search history.

(56) References Cited

U.S. PATENT DOCUMENTS

| | | | |
|---|---|---|---|
| 4,081,942 A | | 4/1978 | Johnson |
| 4,312,171 A * | | 1/1982 | Vadas ............................. 53/403 |
| 4,318,431 A * | | 3/1982 | Evans ............................ 141/90 |
| 4,369,611 A * | | 1/1983 | Canfield .......................... 53/79 |
| 4,418,512 A * | | 12/1983 | Johnson .......................... 53/434 |
| 4,418,513 A * | | 12/1983 | Plahm ............................. 53/434 |
| 4,423,583 A * | | 1/1984 | Carey .............................. 52/373 |
| 4,714,506 A * | | 12/1987 | Yamashiro et al. ............. 156/80 |
| 5,282,349 A * | | 2/1994 | Siegel ............................ 53/433 |
| 5,341,623 A * | | 8/1994 | Siegel ............................ 53/433 |
| 5,353,573 A * | | 10/1994 | Durrant ........................... 53/410 |
| 5,379,572 A * | | 1/1995 | Giovannone .................... 53/478 |
| 6,199,601 B1 * | | 3/2001 | Laudenberg .................... 141/48 |
| 6,581,361 B2 * | | 6/2003 | Haggman et al. .............. 53/563 |
| 6,722,104 B1 * | | 4/2004 | Haggman et al. .............. 53/412 |
| 7,631,476 B2 * | | 12/2009 | Yasuhira et al. ................ 53/434 |
| 2001/0015056 A1 * | | 8/2001 | Hiramoto et al. ............... 53/479 |

(Continued)

FOREIGN PATENT DOCUMENTS

EP    1 388 494 A2    2/2004

(Continued)

*Primary Examiner* — Sameh H. Tawfik
*Assistant Examiner* — Eyamindae Jallow
(74) *Attorney, Agent, or Firm* — Daniel P. Burke & Associates, PLLC

(57) ABSTRACT

A vertical bag packaging machine has a steam nozzle that is inserted into a bag to inject steam thereinto after an article to be packaged has been filled into the bag, thereby replacing the air in the bag with the steam to effect deaeration. After the steam-replacement deaeration, a seal portion to be ultrasonically sealed is preheated by a preheating device, thereby making the temperature of the seal portion uniform throughout it. The preheating temperature is not lower than a temperature of a highest temperature region of said seal portion before it is preheated and below a melting temperature of a material constituting an inner side of said bag Thereafter, the seal portion is ultrasonically sealed by an ultrasonic sealing device. Thus, reliable and stable ultrasonic sealing can be realized.

18 Claims, 7 Drawing Sheets

U.S. PATENT DOCUMENTS

| | | | |
|---|---|---|---|
| 2002/0053190 A1* | 5/2002 | Haggman et al. | 53/558 |
| 2003/0188819 A1 | 10/2003 | Campbell et al. | |
| 2004/0011001 A1* | 1/2004 | Hiramoto | 53/133.2 |
| 2004/0025474 A1* | 2/2004 | Hiramoto | 53/434 |
| 2004/0206049 A1* | 10/2004 | Hiramoto et al. | 53/373.7 |
| 2009/0056281 A1* | 3/2009 | Murray | 53/455 |

FOREIGN PATENT DOCUMENTS

| | | |
|---|---|---|
| EP | 1 808 375 A1 | 7/2007 |
| JP | 02 072024 A | 3/1990 |
| JP | Hei3-126528 | 5/1991 |
| JP | 2000-142605 | 5/2000 |
| JP | 2004-67177 | 3/2004 |

* cited by examiner

VERTICAL-TYPE BAG PACKAGING METHOD AND APPARATUS

BACKGROUND OF THE INVENTION

1. Field of the Invention

The present invention relates to a vertical-type bag packaging method and apparatus in which steam-replacement deaeration is carried out. More particularly, the present invention relates to a vertical-type bag packaging method and apparatus in which a vertically suspended bag is moved, and in the course of the movement, the bag successively undergoes various processes, i.e. filling of an article to be packaged, steam-replacement deaeration to replace the air in the bag with steam, and ultrasonic sealing of the mouth of the bag.

2. Discussion of Related Art

In a so-called vertical bag-type packaging process, an article to be packaged is filled and packaged into a bag while it is moved in a vertically suspended position. It has heretofore been known to perform steam-replacement deaeration in the vertical-type bag packaging process. That is, after the article to be packaged has been filled into the bag, steam is blown into the bag to replace the air in the bag with the steam, thereby effecting deaeration. In a general vertical-type bag packaging machine having a steam-replacement deaeration device, after the steam-replacement deaeration, a seal portion of the bag mouth is pressed between a pair of hot plates heated by respective built-in heaters, thereby sealing the bag mouth.

Ultrasonic sealing is another known method of sealing the mouth of a packaging bag. In the ultrasonic sealing, the bag mouth is pressed between a horn and an anvil, and in this state, the horn is ultrasonically vibrated to generate heat in the seal portion of the bag mouth, thereby welding the seal portion. During the welding process, the filled article adhering to the inner surfaces of the seal portion can be cut off by the ultrasonic vibration and thus removed from the seal portion. Therefore, it is possible to prevent a sealing failure that would otherwise be caused by the undesired presence of the filled article bitten between the inner surfaces of the seal portion.

Japanese Patent Application Publication Nos. Hei 3-126528 and 2000-142605 disclose a technique of ultrasonically sealing a plastic tube in which hot air is blown on the inner peripheral surface of the bag mouth as a pretreatment for the ultrasonic sealing.

Japanese Patent Application Publication No. 2004-67177 discloses a vacuum packaging method and apparatus in which ultrasonic sealing is carried out after the steps of filling an article to be packaged into a bag, performing vacuum deaeration in a vacuum chamber and applying temporary sealing to the bag mouth. The temporary sealing is not a preheat treatment for the ultrasonic sealing but welding of the bag mouth to seal it. The ultrasonic seal is formed below the temporary seal to perfect the sealing of the bag mouth regardless of whether or not there is a sealing failure at the temporarily sealed position due, for example, to the undesired biting of the filled material.

During the steam-replacement deaeration, blowing steam into the bag causes a rise in temperature of the seal portion of the bag mouth. In this regard, the rise in temperature differs from place to place. In the case of using steam at 100° C., for example, the temperature in the vicinity of the widthwise center of the bag increases to from 95° C. to 100° C., for example, and the temperature in the neighborhood of the laterally opposite side edges of the bag increases to around 60° C. The above-described device for heat sealing uses hot plates having a relatively wide width in the vertical direction of the bag, e.g. a width of from 5 mm to 10 mm, to apply, directly to the seal portion, heat of a temperature at which a welding layer laminated on the inner peripheral surface of the bag melts, e.g. heat of around 160° C. in the case of using polypropylene as a welding layer material. Therefore, there is almost no effect on the seal made by the hot plates even if the temperature rise due to the steam blowing process varies according to location as stated above.

In the ultrasonic sealing process, heat is not applied to the seal portion by using an external heat source, but heat is generated in the ultrasonic seal portion as described above, and the pressing surface of the horn is narrow in width in order to efficiently transmit ultrasonic vibration to the seal portion of the bag mouth. In addition, the amount of heat generated by the ultrasonic vibration is substantially uniform independently of the position in the seal portion, that is, at any position in the longitudinal direction of the horn and the anvil. Accordingly, if the temperature rise due to the steam-replacement deaeration varies according to location, the total heat quantity varies. Consequently, incomplete welding occurs in a region where the heat quantity is insufficient. A region where the heat quantity is excessive is overheated, which may cause melting of even a layer laminated on the outside of the bag, resulting in the seal portion being melted and torn. No part of the above-mentioned patent literatures discloses the problems arising when a bag that has been subjected to steam-replacement deaeration is ultrasonically sealed, particularly how the preheat treatment should be performed, not to mention the problem of the nonuniform heat distribution over the bag caused by the steam-replacement deaeration.

SUMMARY OF THE INVENTION

Accordingly, an object of the present invention is to provide a packaging method and a packaging machine that are capable of reliably and stably performing ultrasonic sealing in the vertical-type bag packaging process in which steam-replacement deaeration is carried out.

The present invention provides a vertical-type bag packaging method of filling and packaging an article to be packaged into a bag while moving the bag along a predetermined path in a vertically suspended position. The method includes a filling step of filling the article to be packaged into the bag, a steam-replacement deaeration step of replacing the air in the bag with steam to effect deaeration, a preheating step of preheating a seal portion of the mouth of the bag, and an ultrasonic sealing step of ultrasonically sealing the seal portion of the bag mouth. The preheating step is provided between the steam-replacement deaeration step and the ultrasonic sealing step to preheat the seal portion to a temperature not lower than the temperature of the highest temperature region of the seal portion before it is preheated and below the melting temperature of the material constituting the inner side of the bag.

The preheating in the preheating step may be carried out by using steam supplied from the same steam supply source as that for the steam used in the steam-replacement deaeration step.

The preheating in the preheating step may be carried out by pressing the seal portion of the bag mouth between a pair of pressing members that are movable toward and away from each other and that are heated by a heat source.

In addition, the present invention provides a vertical-type bag packaging machine that fills and packages an article to be packaged into a bag while moving the bag along a predetermined path in a vertically suspended position. The machine includes an intermittently rotating rotary table and a plurality of holding members installed on the rotary table at predetermined spaces in the circumferential direction of the rotary table. Each holding member holds the bag in a vertically suspended position. The holding members are successively stopped at predetermined stop positions by the intermittent rotation of the rotary table. The vertical bag packaging machine further includes a filling device disposed at one of the predetermined stop positions along the outer periphery of the rotary table to fill the article to be packaged into the bag, a steam-replacement deaeration device disposed at another of the predetermined stop positions along the outer periphery of the rotary table to replace the air in the bag with steam to thereby effect deaeration, an ultrasonic sealing device disposed at another of the predetermined stop positions that is next to the stop position where the steam-replacement deaeration device is disposed in the direction of rotation of the rotary table along the outer periphery of the rotary table to ultrasonically seal the seal portion of the bag mouth, and a preheating device that preheats the seal portion of the bag mouth to a predetermined preheating temperature before the seal portion is ultrasonically sealed by the ultrasonic sealing device. The preheating device is disposed at the same stop position as that where the steam-replacement deaeration device is disposed to preheat the seal portion to a temperature not lower than the temperature of the highest temperature region of the seal portion before it is preheated and below the melting temperature of the material constituting the inner side of the bag.

The preheating device may have a pair of pressing members movable toward and away from each other to press the seal portion of the bag mouth therebetween, and a heat source that heats the pressing members.

The pressing members may each have a flow path therein through which steam flows. The flow path may be supplied with steam from the same supply source as that for the steam used in the steam-replacement deaeration device.

Another structure of the preheating device may be as follows. The preheating device has a pair of hot plates movable toward and away from each other by a predetermined distance, and a heater provided in each hot plate as a heat source. The hot plates have heat-radiating portions, respectively, which come to predetermined positions, respectively, close to the seal portion of the bag mouth when the hot plates move toward each other by the predetermined distance. The seal portion of the bag is preheated by radiant heat from the heat-radiating portions.

Further, the vertical-type bag packaging machine may be arranged as follows. The ultrasonic sealing device ultrasonically seals the seal portion at a position of the bag away from the edge of the mouth of the bag. The hot plates have pressing portions, respectively, which press the bag therebetween at a position between a position above the seal portion and the edge of the mouth of the bag when the hot plates move toward each other by the predetermined distance.

In the present invention arranged as stated above, the seal portion of the bag is preheated after the steam-replacement deaeration and before the ultrasonic sealing process to a temperature not lower than the temperature of the highest temperature region of the seal portion before it is preheated and below the melting temperature of the material constituting the inner side of the bag. Therefore, the temperature of the seal portion can be made uniform throughout it before ultrasonic sealing is applied thereto. Because the seal portion is ultrasonically sealed in this state, reliable and stable ultrasonic sealing can be realized.

When the preheating is carried out by using steam from the same supply source as that for steam used in the steam-replacement deaeration, it is unnecessary to provide a heat source special for preheating. In addition, a change of the preheating temperature required due to a change in temperature of steam for the steam-replacement deaeration can be made simultaneously with the steam temperature change, which is very favorable for the bag packaging operation.

Providing each preheating member with a pressing portion and a heat-radiating portion allows the preheating and so-called decorative sealing to be performed simultaneously, which improves the operating efficiency.

Other objects and advantages of the present invention will become apparent from the following detailed description of illustrated embodiments of the invention.

DETAILED DESCRIPTION OF THE PREFERRED EMBODIMENTS

Embodiments of the present invention will be described below with reference to the accompanying drawings. It should be noted that the following embodiments are for illustrative purposes only, and that the scope of the present invention is not limited to these embodiments.

Figure 1:
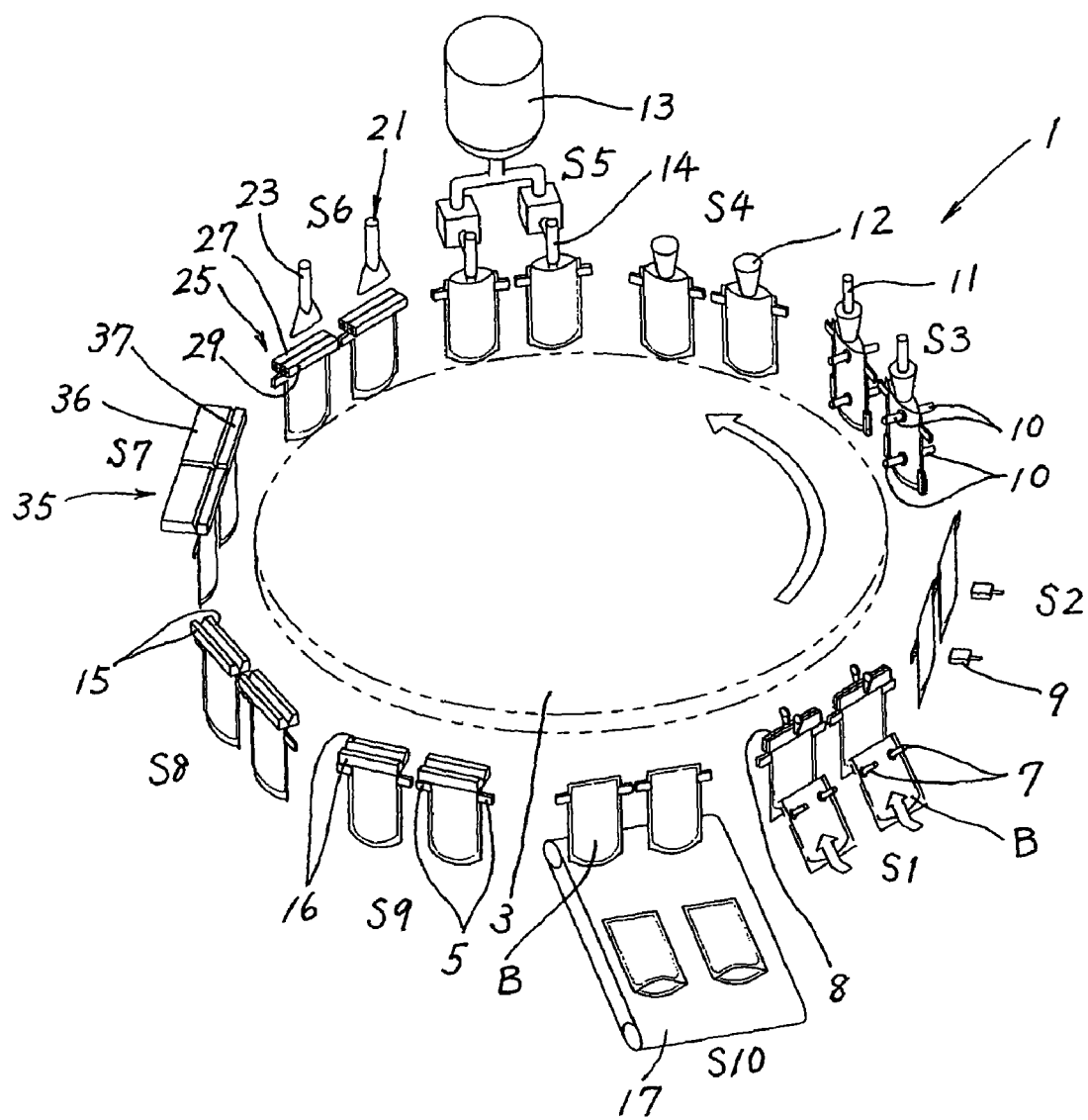
FIG. 1 is a perspective view showing the overall structure of a vertical-type bag packaging machine according to a first embodiment of the present invention.

FIG. 1 is a perspective view showing the overall structure of a vertical-type bag packaging machine (hereinafter referred to as "packaging machine") 1 according to a first embodiment of the present invention. In this embodiment, the packaging machine 1 is of a rotary type having a rotary table 3. The rotary table 3 is provided with pairs of grippers 5 at predetermined spaces in the circumferential direction. Each pair of grippers 5 hold a bag B by gripping the laterally opposite side edges thereof. Thus, as the rotary table 3 rotates intermittently, the bag B moves successively through various stations, i.e. stop positions S1 to S10. At the stations S1 to S10, various processing steps are executed while the rotary table 3 is at rest. It should be noted that the packaging machine 1 in this embodiment is a so-called double packaging machine, in which two bags B are simultaneously subjected to the same processing at each step.

At the first station S1, a bag feeding step is carried out. A bag B that is stored in a horizontal position in a bag magazine (not shown) is taken out by bag take-out suction cups 7 and moved upward before being delivered to a bag feeding chuck 8. The chuck 8 holds the mouth of the bag B and moves the bag B toward the grippers 5. While doing so, the chuck 8 changes the orientation of the bag B through 90 degrees to an upright position. A pair of grippers 5 receive and hold the upright bag B. At the subsequent station S2, a printing step is carried out to print the bag B with data, e.g. the date of manufacture, by a printer 9. At the station S3, a bag opening step is carried out. The bag B is opened by using mouth opening suction cups 10 and an air nozzle 11. At the station S4, the bag B is filled with a solid material through a funnel 12. At the station S5, the bag B is filled with a liquid material from a tank 13 through a nozzle 14.

The subsequent station S6 is provided with a steam-replacement deaeration device 21 and a preheating device 25 to carry out a steam-replacement deaeration step and a seal portion preheating step, which will be explained later. The station S7 is provided with an ultrasonic sealing device 36 to carry out an ultrasonic sealing step, which will also be explained later. At the station S8, the bag B is decoratively sealed at a portion thereof extending from the position ultrasonically sealed at the station S7 to the edge Ba of the mouth of the bag B by using hot plates 15 for decorative sealing that press the bag B from both sides. The reason for decoratively sealing the bag B is as follows. If the sheets constituting the side walls of the bag B are not welded together at a portion thereof extending from the ultrasonically sealed position to the bag mouth edge, the bag mouth is open, which does not look nice, and contamination may enter between the side wall sheets of the bag B. The decorative sealing is provided to prevent these problems. Therefore, the decorative sealing is not required to exhibit perfect sealing performance. At the station S9, a cooling step is carried out to cool the ultrasonically and decoratively sealed portion of the bag B by using cooling plates 16. At the final station S10, the bag B finished as a product is discharged onto a carry-out conveyor 17. It should be noted that the term "seal portion" as used in the claims and specification of this application means a portion to be ultrasonically sealed or an ultrasonically sealed portion.

The following is an explanation of the steam-replacement deaeration process and the preheating process for the seal portion of the bag B at the station S6 and the ultrasonic sealing process at the station S7. The explanation will be made with reference to FIGS. 2 to 7. As has been stated above, the station S6 is equipped with a steam-replacement deaeration device 21. As is publicly known, after the bag B has been filled with an article to be packaged, the steam-replacement deaeration device 21 blows steam into the bag B to replace the air in the bag B with the steam to thereby deaerate the interior of the bag B. The steam-replacement deaeration device 21 has a steam supply source (not shown) and a steam nozzle 23 connected thereto. In addition, the station S6 is equipped with a preheating device 25. The preheating device 25 has a pair of pressing plates 27 and 29 serving as preheating members, which are opposed to each other across the bag B. The pressing plates 27 and 29 are elongated members of a rectangular sectional shape that extend beyond the overall width of the bag B. The pressing plates 27 and 29 have longitudinally extending steam flow paths 28 and 30 therein, respectively, which are connected to the above-described steam supply source of the steam-replacement deaeration device 21 through piping (not shown).

Figure 2:
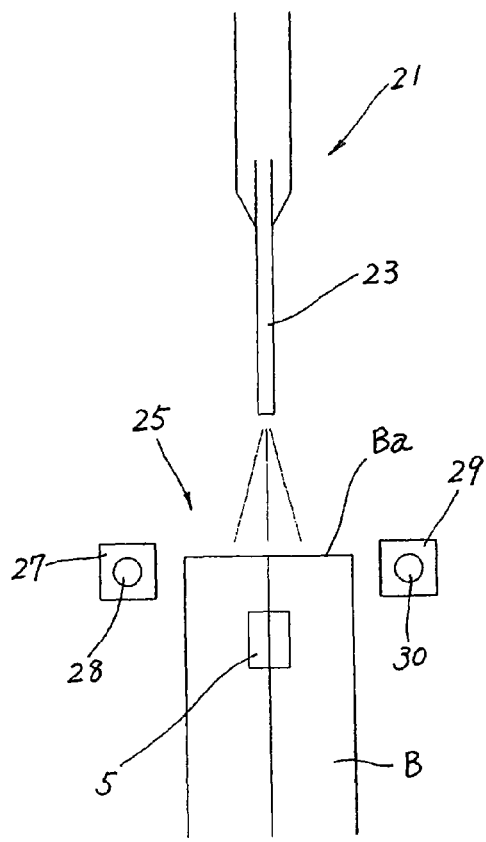
FIG. 2 is a diagram showing a steam-replacement deaeration step in the first embodiment at the time of starting this step.

In FIG. 2, the bag B filled with the liquid material at the station S5 moves to and stops at the station S6. At this time, the grippers 5 gripping the laterally opposite side edges of the bag B are at respective positions where the grippers 5 have moved toward each other, so that the edge Ba of the mouth of the bag B is open (in FIG. 2, the width direction of the bag B is perpendicular to the plane of the figure; the same is the case with FIGS. 3 to 13). The steam nozzle 23 is vertically movably supported by a support device (not shown). The steam nozzle 23 is at a raised position when the bag B is moving to the station S6. Meanwhile, the pressing plates 27 and 29 of the preheating device 25 are at respective positions facing each other across the bag B. The pressing plates 27 and 29 are movable toward and away from each other by a driving mechanism (not shown). The driving mechanism used to move the pressing plates 27 and 29 toward and away from each other is of the same type as that used in a conventionally known heat-sealing device that seals the bag mouth by pressing it between a pair of hot plates. This embodiment uses such a conventionally known driving mechanism. Therefore, a detailed explanation thereof is omitted herein. As shown in FIG. 2, the pressing plates 27 and 29 are at respective positions away from each other when the bag B is moved to the station S6. It should be noted that the steam flow paths 28 and 30 of the pressing plates 27 and 29 are supplied with steam from the steam supply source of the steam-replacement deaeration device 21, as stated above, to heat the pressing plates 27 and 29 to a predetermined temperature. When the steam flow paths 28 and 30 are supplied with steam at 100° C., for example, the pressing plates 27 and 29 are heated to a temperature substantially close to 100° C.

Figure 3:
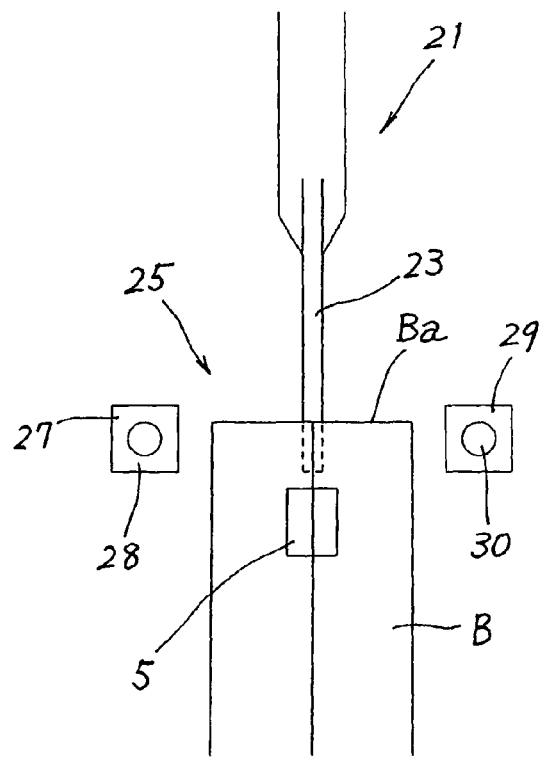
FIG. 3 is a diagram showing a state where a steam nozzle has been inserted into a bag.

When the bag B stops at the station S6, first, the steam nozzle 23 is lowered to insert the distal end thereof into the bag B (see FIG. 3). The pressing plates 27 and 29 remain at the previous positions. In this embodiment, the injection of steam into the bag B from the steam nozzle 23 is started at the same time as the starting of the downward movement of the steam nozzle 23. However, the injection of steam may be started at any properly selected timing. For example, the steam injection may be started when the steam nozzle 23 approaches the bag mouth edge Ba, or after the distal end of the steam nozzle 23 has been inserted into the bag B. The grippers 5 gripping the laterally opposite side edges of the bag B are moved away from each other at a predetermined timing after the distal end of the steam nozzle 23 has been inserted into the bag B, thereby bringing the mouth of the bag B into a tensed state. Consequently, the bag mouth comes into substantially close contact with the periphery of the steam nozzle 23 (see FIG. 4). The injection of steam into the bag B is continued all the time to replace the air in the bag B with steam. The pressing plates 27 and 29 remain away from each other.

After the injection of steam has been carried out for a predetermined period of time, the steam nozzle 23 is removed from the bag B, and the grippers 5 are further moved away from each other to tense and close the bag mouth. Substantially at the same time, the pressing plates 27 and 29 are moved toward each other to press and heat the bag mouth from both sides (see FIG. 5). The bag mouth is pressed and heated over an area including at least a seal portion to be ultrasonically sealed at the subsequent step S7. In this embodiment, the bag mouth is heated over an area extending from slightly below the seal portion, which is to be ultrasonically sealed, to the bag mouth edge Ba. After the bag mouth has been heated for a predetermined period of time, the pressing plates 27 and 29 are moved away from each other (see FIG. 6).

Next, the bag B is moved to the station S7 with the bag mouth kept closed. The station S7 is equipped with an ultrasonic sealing device 36 having a horn 36 and an anvil 37 that are supported movably toward and away from each other. The horn 36 and the anvil 37 are standing by at respective positions away from each other (see FIG. 7). When the bag B stops, the horn 36 and the anvil 37 are moved toward each other as shown by the arrows in the figure to abut against each other with the bag B held therebetween. When ultrasonic vibration is applied to the horn 36, heat is generated in the seal portion of the bag B, as is publicly known, whereby the material constituting the inner side of the bag B is melted to effect sealing.

Figure 4:
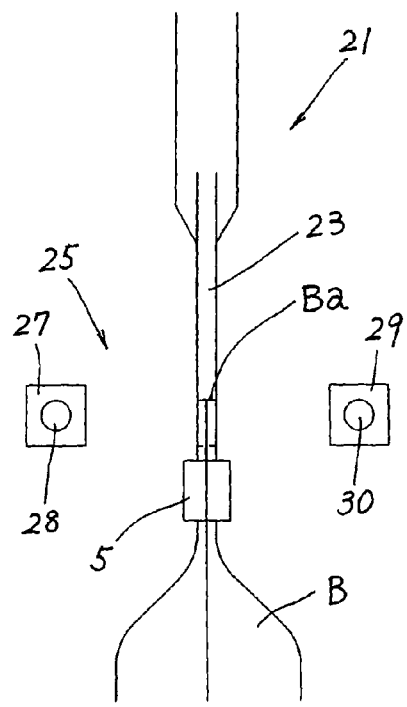
FIG. 4 is a diagram showing a state where the bag mouth is tensed.
Figure 5:
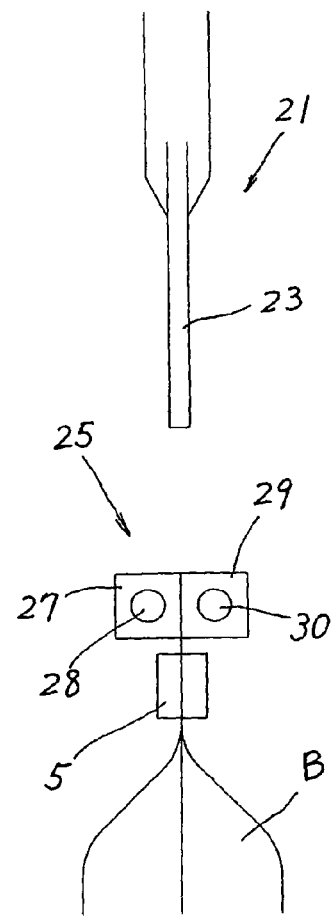
FIG. 5 is a diagram showing a state where the steam nozzle has been removed from the bag and pressing plates are preheating a seal portion.
Figure 6:
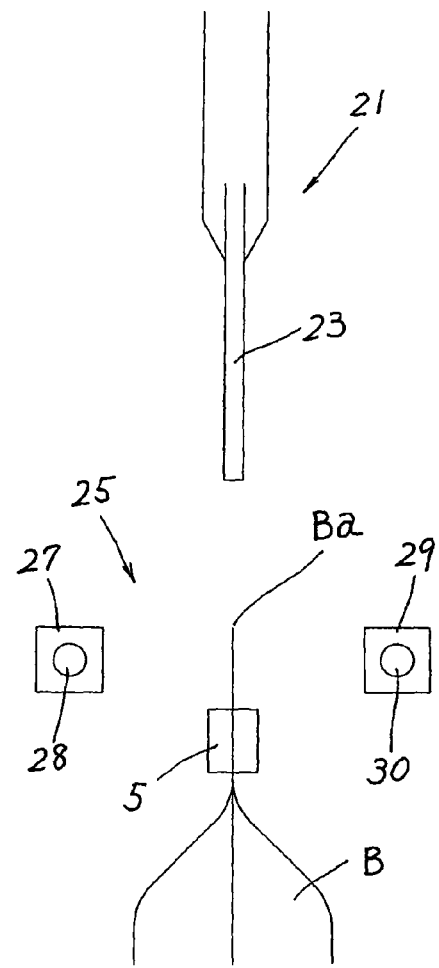
FIG. 6 is a diagram showing a state where the pressing plates have separated from the bag.
Figure 7:
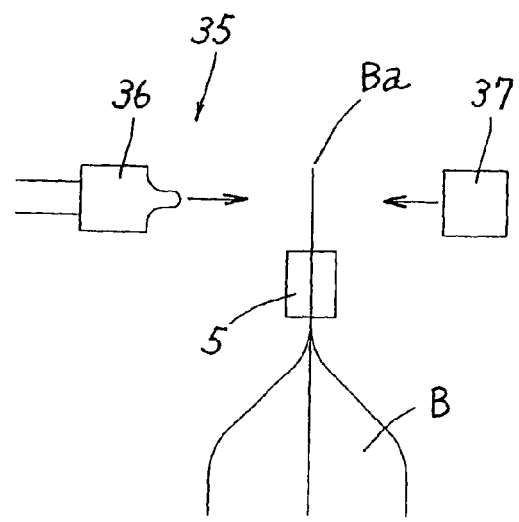
FIG. 7 is a diagram showing a state where the bag is being subjected to ultrasonic sealing.

While the steam-replacement deaeration is being carried out as shown in FIGS. 2 to 4, a portion of the mouth of the bag B that is to be sealed at the ultrasonic sealing step is heated by the steam injected into the bag B. In this regard, the temperature of the heated portion of the bag B varies according to location. In general, the temperature is relatively high in the vicinity of the lateral center of the bag B and relatively low at the laterally opposite side edge portions of the bag B. The temperature of the highest temperature region of the portion of the bag B to be ultrasonically sealed before it is preheated varies according to the amount of steam injected, the length of time of steam injection, the opening condition of the bag mouth, the filling condition of the filled article, the length of time from the steam-replacement deaeration to the starting of the preheating process (i.e. temperature lowering time), etc. When the temperature of steam used is 100° C., for example, the temperature of the highest temperature region of the portion of the bag B to be ultrasonically sealed is, generally, equal to or 5 to 10° C. lower than the steam temperature, i.e. 100° C. The seal portion, i.e. portion to be ultrasonically sealed, which has a temperature variation as stated above, is pressed and heated between a pair of pressing plates heated by steam from the same supply source as that for the steam-replacement deaeration to substantially the same temperature as that of the steam. By so doing, the temperature of the seal portion to be ultrasonically sealed can be made uniform throughout it.

Meanwhile, ultrasonic sealing applied to the bag B at the station S7 utilizes heat generated by friction caused at the seal portion by ultrasonic vibration. In this regard, the amount of heat generated by friction is uniform throughout the seal portion. Therefore, if the bag B merely subjected to the steam-replacement deaeration at the station S6 is moved to the station S7 and ultrasonically sealed thereat, there will be variation in the total sum of the amount of heat remaining in each region of the seal portion after the steam-replacement deaeration and the amount of heat generated during the ultrasonic sealing, which may result in a sealing failure. That is, in a region of the seal portion where the amount of heat is insufficient, the inner surfaces of the side walls of the bag B will not weld together, whereas in a region of the seal portion where the amount of heat is excessive, not only the side wall inner surfaces but also the outer layers of the bag B are melted, which may cause the bag B to be torn. According to this embodiment, however, preheating is carried out after the steam-replacement deaeration to make the temperature uniform throughout the seal portion in advance. Consequently, the amount of heat becomes uniform throughout the seal portion when the ultrasonic sealing is carried out. Thus, a satisfactory sealing condition can be obtained. It is a matter of course that the preheating temperature is lower than the melting temperature of the material constituting the inner side of the bag B.

In the foregoing embodiment, the pressing plates are heated by steam and the seal portion of the bag is pressed between the heated pressing plates to preheat it. According to another embodiment, elongated members similar to the pressing plates are each provided with a large number of steam outlets along the longitudinal direction thereof. The elongated members are brought close to the seal portion of the bag, and steam is blown over the seal portion to preheat it to a uniform temperature.

Next, a packaging machine 51 according to a second embodiment of the present invention will be explained with reference to FIGS. 8 to 13. FIGS. 8 to 13 correspond to FIGS. 2 to 7, respectively, which relate to the first embodiment of the present invention. The packaging machine 51 differs from the packaging machine 1 of the first embodiment only in the preheating device used therein, and the other structures of the packaging machine 51 are the same as those of the packaging machine 1. Therefore, the same members as those of the packaging machine 1 are denoted by the same reference numerals as those used in the first embodiment, and a detailed explanation thereof is omitted herein. It should be noted that, in the second embodiment, decorative sealing is performed simultaneously with preheating, as will be explained later. Unlike in the first embodiment, decorative sealing after the ultrasonic sealing process is not carried out. Accordingly, the seal portion-cooling step is carried out next to the ultrasonic sealing step. Hence, the number of processing steps can be reduced in comparison with the first embodiment.

Figure 8:
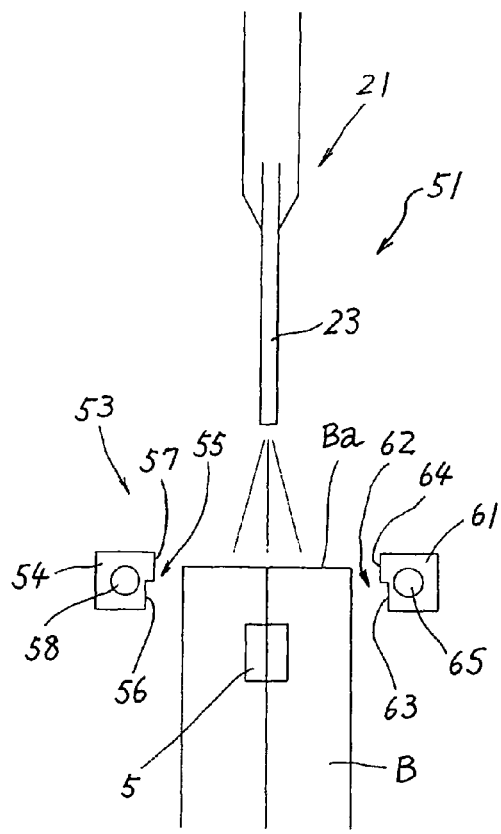
FIG. 8 is a diagram showing a second embodiment of the present invention, corresponding to FIG. 2, which shows the first embodiment.

In FIG. 8, reference numeral 21 denotes a steam-replacement deaeration device having a steam nozzle 23. Reference numeral 53 denotes a preheating device having a pair of hot plates 54 and 61. The hot plates 54 and 61 are elongated members having a substantially rectangular sectional shape and longer than the width of the bag B in the same way as the pressing plates 27 and 29 in the first embodiment. The configuration of the hot plates 54 and 61 differs from that of the pressing plates 27 and 29 in that the mutually opposing working surfaces 55 and 62 of the hot plates 54 and 61 are provided with steps, respectively. That is, each hot plate 54 (61) comprises a lower surface serving as a heat-radiating surface 56 (63) and an upper surface as a pressing surface 57 (64), which is located forward of the heat-radiating surface 56 (63). Unlike in the first embodiment, the preheating device 53 does not utilize steam but instead has heaters 58 and 65 as heat sources that are built in the hot plates 54 and 61, respectively. FIG. 8 shows a state where the bag B has moved to and stopped at the station S6 and the steam nozzle 23 has started injecting steam and is starting to move downward. The hot plates 54 and 61 remain at respective positions away from each other.

Figure 9:
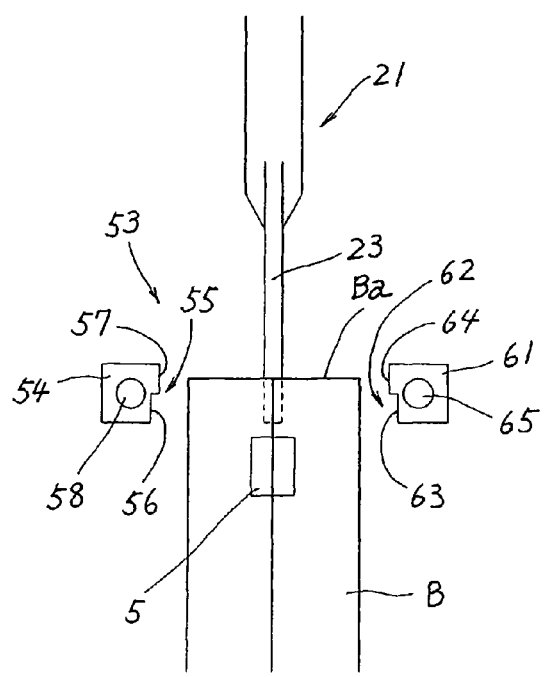
FIG. 9 is a diagram showing the second embodiment, corresponding to FIG. 3, which shows the first embodiment.
Figure 10:
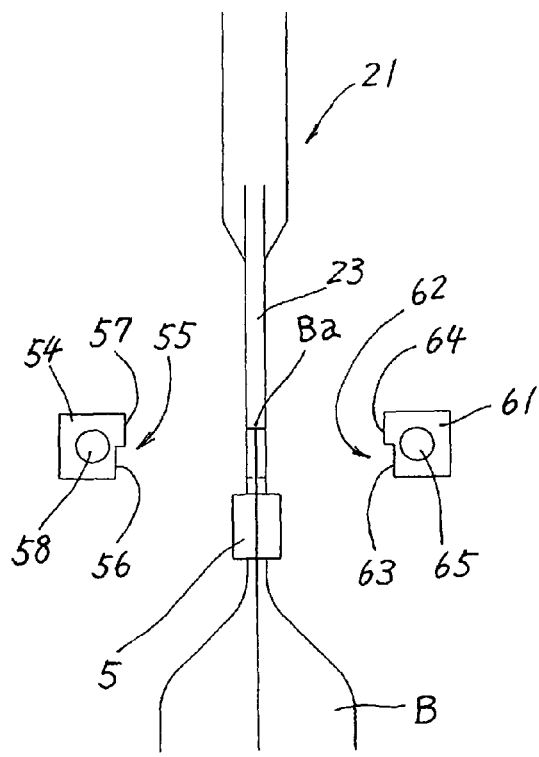
FIG. 10 is a diagram showing the second embodiment, corresponding to FIG. 4, which shows the first embodiment.
Figure 11:
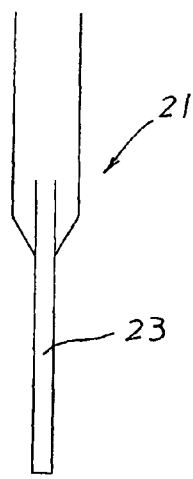
FIG. 11 is a diagram showing the second embodiment, corresponding to FIG. 5, which shows the first embodiment.
Figure 11:
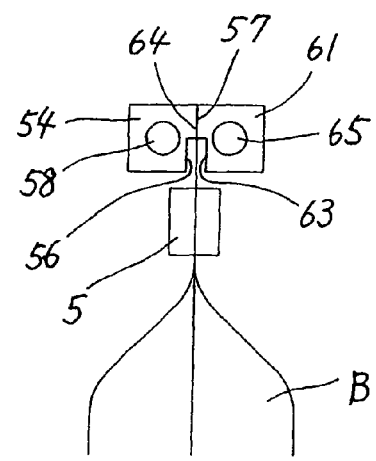
Figure 12:
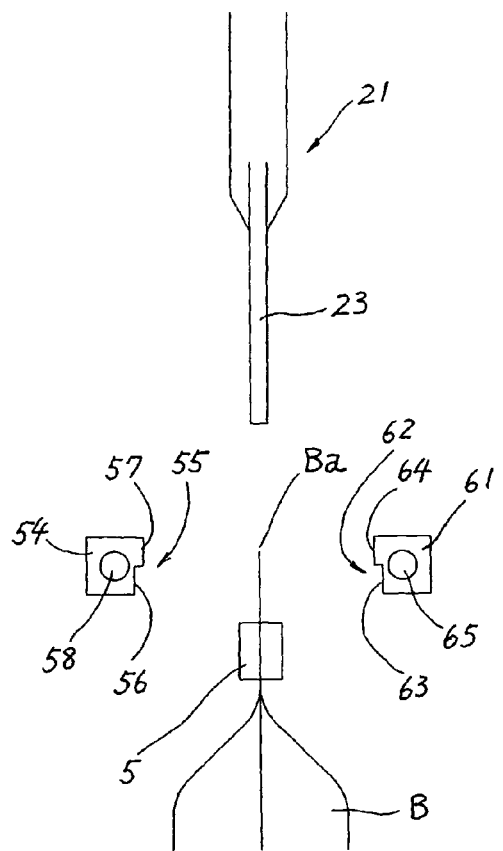
FIG. 12 is a diagram showing the second embodiment, corresponding to FIG. 6, which shows the first embodiment.

In FIG. 9, the distal end of the steam nozzle 23 has been inserted into the bag B. The hot plates 54 and 61 remain at the previous positions. In FIG. 10, the grippers 5 are moved away from each other by a predetermined distance, thereby bringing the mouth of the bag B into a tensed state, and thus causing the bag mouth to stick fast to the periphery of the steam nozzle 23. In FIG. 11, the steam nozzle 23 has been removed from the bag B, and the hot plates 54 and 61 have moved toward each other by a predetermined distance. In this state, the upper, pressing surfaces 57 and 64 are abutting against each other with the bag B held therebetween at a position above the seal portion of the bag B that is to be ultrasonically sealed, whereas the lower, heat-radiating surfaces 56 and 63 are separate from the bag B by a slight distance. That is, the pressing surfaces 57 and 64 apply decorative sealing to a portion of the bag B that is closer to the bag mouth edge than the seal portion to be ultrasonically sealed. Meanwhile, heat is radiated from the heat-radiating surfaces 56 and 63, and the radiant heat preheats the seal portion to be ultrasonically sealed. In a case where the material constituting the inner surfaces of the side walls of the bag B is polypropylene, for example, the melting temperature of the material is about 160° C., and the hot plates 54 and 61 are heated to substantially the same temperature as the melting temperature. Accordingly, the portion of the bag B at a side of the seal portion closer to the bag mouth edge can be decoratively sealed, and the seal portion to be ultrasonically sealed can be preheated to a uniform temperature. In this regard, the seal portion is preheated to a temperature slightly lower than 160° C. because of radiant heat.

Figure 13:
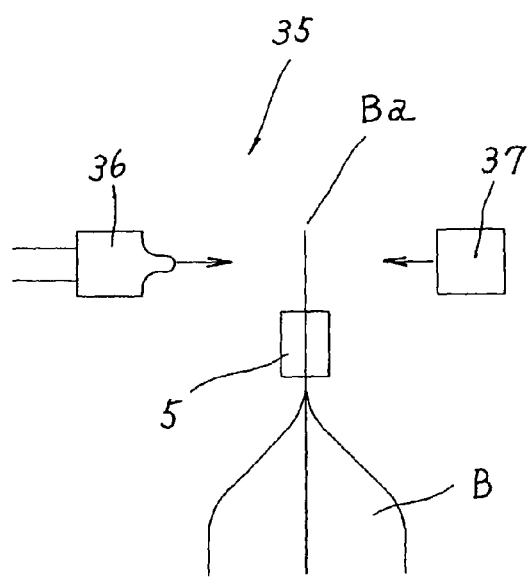
FIG. 13 is a diagram showing the second embodiment, corresponding to FIG. 7, which shows the first embodiment.

After the decorative sealing and the preheating of the seal portion to be ultrasonically sealed have been carried out as stated above, the hot plates 54 and 61 are moved away from each other (see FIG. 12), and the bag B is moved to the station S7, where the bag B is subjected to ultrasonic sealing using an ultrasonic sealing device 35 having a horn 36 and an anvil 37 in the same way as in the first embodiment (see FIG. 13). The second embodiment is advantageous in that decorative sealing and preheating can be performed simultaneously.

It should be noted that the present invention is not limited to the foregoing embodiments but can be modified in a variety of ways.

What is claimed is:

1. A vertical-type bag packaging machine that fills and packages a material to be packaged into a bag having a seal portion to be ultrasonically seal while intermittently moving a bag along a predetermined path in a vertically suspended position, said machine comprising:

an intermittently movable support;

a plurality of holding members connected to said support at predetermined spaced locations, each of said holding members arranged for holding a bag in a vertically suspended position, said holding members being successively moved to predetermined stations by intermittent movement of said support;

a plurality of packaging processing devices, said packaging processing devices disposed at one or more of said predetermined stations;

said plurality of packaging processing devices comprising a filling device for carrying out a filling process by dispensing a material to be packaged into a bag, a steam-replacement deaeration device for carrying out a steam-replacement deaeration process by replacing air in a bag with steam to thereby effect deaeration, a preheating device for carrying out a preheating process by preheating a seal portion of a mouth of a bag to a predetermined preheating temperature, and an ultrasonic sealing device for carrying out an ultrasonic sealing process by ultrasonically sealing a seal portion of a mouth of a bag;

wherein said filling device, a steam-replacement deaeration device, preheating device and ultrasonic sealing device are arranged so that said filling process, steam-replacement deaeration process, preheating process and ultrasonic sealing process are carried out in this order, and wherein said predetermined preheating temperature is not lower than a temperature of a highest temperature region of said seal portion before said seal portion is preheated and is below the melting temperature of a material constituting an inner side of said seal portion of said bag.

2. The vertical-type bag packaging machine of claim 1, wherein said preheating device comprises:

a pair of pressing members movable toward and away from each other to press said seal portion of the mouth of a bag therebetween; and a heat source that heats said pressing members.

3. The vertical-type bag packaging machine of claim 2, wherein said pressing members each comprise a flow path therein through which steam flows, said flow path being supplied with steam from a same supply source as that for the steam used in said steam-replacement deaeration device.

4. The vertical-type bag packaging machine of claim 2, wherein said support comprises a rotary table.

5. The vertical-type bag packaging machine of claim 1, wherein said preheating device comprises:

a pair of hot plates movable toward and away from each other by a predetermined distance; and a heater provided in each of said hot plates as a heat source;

said hot plates comprising heat-radiating portions, respectively, which come to predetermined positions, respectively, spaced from and close to said seal portion of a mouth of a bag when said hot plates move toward each other by said predetermined distance;

wherein said seal portion is preheated by radiant heat from said heat-radiating portions.

6. The vertical-type bag packaging machine of claim 5, wherein said ultrasonic sealing device ultrasonically seals said seal portion at a position of a bag spaced from an edge of the mouth of a bag;

said hot plates comprising pressing portions, respectively, which press said bag therebetween at a position between a position above said seal portion and the edge of the mouth of said bag when said hot plates move toward each other by said predetermined distance.

7. The vertical-type bag packaging machine of claim 6, wherein said support comprises a rotary table.

8. The vertical-type bag packaging machine of claim 5, wherein said support comprises a rotary table.

9. The vertical-type bag packaging machine of claim 1, wherein said support comprises a rotary table.

10. A vertical-type bag packaging machine that fills and packages a material to be packaged into a bag having a seal portion to be ultrasonically seal while intermittently moving a bag along a predetermined path in a vertically suspended position, said machine comprising:

an intermittently movable support;

a plurality of holding members connected to said support at predetermined spaced locations, each of said holding members arranged for holding a bag in a vertically suspended position, said holding members being successively moved to predetermined stations by intermittent movement of said support;

a plurality of packaging processing devices, said packaging processing devices disposed at one or more of said predetermined stations;

said plurality of packaging processing devices comprising a filling device for carrying out a filling process by dispensing a material to be packaged into a bag, a steam-replacement deaeration device for carrying out a steam-replacement deaeration process by replacing air in a bag with steam to thereby effect deaeration, a preheating device for carrying out a preheating process by preheating a seal portion of a mouth of a bag to a predetermined preheating temperature, and an ultrasonic sealing device for carrying out an ultrasonic sealing process by ultrasonically sealing a seal portion of a mouth of a bag;

wherein said filling device, a steam-replacement deaeration device, preheating device and ultrasonic sealing device are arranged so that said filling process, steam-replacement deaeration process, preheating process and ultrasonic sealing process are carried out in this order, and wherein said predetermined preheating temperature is not lower than a temperature of a highest temperature region of said seal portion before said seal portion is preheated and is below the melting point of a material constituting an inner side of said seal portion of said bag.

11. The vertical-type bag packaging machine of claim 10 wherein said preheating device comprises:

a pair of pressing members movable toward and away from each other to press a said seal portion of the mouth of a bag there between; and a heat source that heats said pressing members.

12. The vertical-type bag packaging machine of claim 11 wherein said pressing members each comprise a flow path therein through which steam flows, said flow path being supplied with steam from a same supply source as that for the steam used in said steam-replacement deaeration device.

13. The vertical-type bag packaging machine of claim 11 wherein said support comprises a rotary table.

14. The vertical-type bag packaging machine of claim 10 wherein said preheating device comprises:

a pair of hot plates movable toward and away from each other by a predetermined distance; and a heater provided in each of said hot plates as a heat source;

said hot plates comprising heat-radiating portions, respectively, which come to predetermined positions, respectively, spaced from and close to a said seal portion of a mouth of a bag when said hot plates move toward each other by said predetermined distance;

wherein a said seal portion is preheated by radiant heat from said heat-radiating portions.

15. The vertical-type bag packaging machine of claim 14 wherein said ultrasonic sealing device ultrasonically seals said seal portion at a position of a bag spaced from an edge of the mouth of a bag;

said hot plates comprising pressing portions, respectively, which press said bag there between at a position between a position above said seal portion and the edge of the mouth of said bag when said hot plates move toward each other by said predetermined distance.

16. The vertical-type bag packaging machine of claim 15 wherein said support comprises a rotary table.

17. The vertical-type bag packaging machine of claim 14 wherein said support comprises a rotary table.

18. The vertical-type bag packaging machine of claim 10 wherein said support comprises a rotary table.

* * * * *